United States Patent
Singh et al.

(10) Patent No.: US 12,229,386 B2
(45) Date of Patent: Feb. 18, 2025

(54) SHORTCUT COMMANDS FOR APPLICATIONS

(71) Applicant: Citrix Systems, Inc., Fort Lauderdale, FL (US)

(72) Inventors: Manbinder Pal Singh, Coral Springs, FL (US); Tejus Adiga M, Udupi (IN)

(*) Notice: Subject to any disclaimer, the term of this patent is extended or adjusted under 35 U.S.C. 154(b) by 0 days.

(21) Appl. No.: 17/644,647

(22) Filed: Dec. 16, 2021

(65) Prior Publication Data

US 2023/0195278 A1 Jun. 22, 2023

(51) Int. Cl.
*G06F 3/0482* (2013.01)
*G06F 3/0488* (2022.01)
*G06F 9/451* (2018.01)

(52) U.S. Cl.
CPC .......... *G06F 3/0482* (2013.01); *G06F 3/0488* (2013.01); *G06F 9/451* (2018.02)

(58) Field of Classification Search
CPC ....... G06F 3/0482; G06F 9/451; G06F 3/0488
See application file for complete search history.

(56) References Cited

U.S. PATENT DOCUMENTS

| | | | |
|---|---|---|---|
| 8,812,960 B1 | 8/2014 | Sun | |
| 9,183,004 B2 | 11/2015 | Manjunath | |
| 9,491,229 B1* | 11/2016 | Lachwani | G06Q 30/04 |
| 10,282,088 B2* | 5/2019 | Kim | G06F 3/04883 |
| 2005/0125530 A1* | 6/2005 | Brockway | H04L 67/56 |
| | | | 709/224 |
| 2009/0178004 A1 | 7/2009 | Stoval, III | |
| 2011/0246881 A1 | 10/2011 | Kushman | |
| 2012/0159334 A1* | 6/2012 | Messerly | G06F 9/546 |
| | | | 715/733 |
| 2012/0284357 A1 | 11/2012 | Meisels | |
| 2013/0027612 A1* | 1/2013 | Miloseski | H04N 21/4622 |
| | | | 348/E5.099 |
| 2013/0179833 A1* | 7/2013 | Stallings | G06F 3/0482 |
| | | | 715/810 |
| 2013/0222296 A1 | 8/2013 | Paek | |
| 2014/0075428 A1* | 3/2014 | Van Elsas | G06Q 30/0255 |
| | | | 717/174 |
| 2016/0342314 A1 | 11/2016 | Dickerson | |

(Continued)

OTHER PUBLICATIONS

International Search Report and Written Opinion dated Aug. 9, 2021 for International application No. PCT/US2021/029549; 14 Pages.

(Continued)

*Primary Examiner* — Beau D Spratt

(57) ABSTRACT

In some embodiments, a method includes: receiving, by a computing device, shortcut commands from a plurality of applications, the shortcut commands provide access to features of different applications of the plurality, and the plurality including both active and inactive applications in execution; generating, by the computing device, a list of shortcut commands in response to a transition of a first application of the plurality from a state of inactive use to a state of active use, the list including a shortcut command from at least one inactive application of the plurality; and causing, by the computing device, display of a user interface that includes the list to enable access to a feature of an inactive application in response to selection of at least one shortcut command of the list.

19 Claims, 11 Drawing Sheets

(56) References Cited

U.S. PATENT DOCUMENTS

| | | |
|---|---|---|
| 2017/0161085 A1 | 6/2017 | Tobin |
| 2017/0192941 A1* | 7/2017 | Glover |
| 2018/0196865 A1* | 7/2018 | Rabin .................. G06F 9/54 |
| 2019/0196674 A1 | 6/2019 | Baig |
| 2020/0042295 A1 | 2/2020 | Straub |
| 2020/0057541 A1 | 2/2020 | Wantland |
| 2020/0226615 A1 | 7/2020 | Gaur |
| 2022/0083610 A1* | 3/2022 | Gilliam ............. G06F 16/9538 |
| 2023/0126163 A1* | 4/2023 | Wu ..................... G10L 15/22 |
| | | 704/275 |

OTHER PUBLICATIONS

Office Action (Non-Final Rejection) dated May 18, 2022 for U.S. Appl. No. 17/482,899 (pp. 1-21).

\* cited by examiner

SHORTCUT COMMANDS FOR APPLICATIONS

BACKGROUND

Many computing devices and software applications provide shortcut commands (or "shortcuts") that can be used to quickly access system-level and application-specific features. For example, an application may provide a shortcut for accessing a feature using a single input (e.g., a single click or touch) that would otherwise require multiple inputs to access. Some computing devices include an interface (referred to herein as a "shortcut interface") that can be dynamically configured to allow a user to interact with content displayed by the computing device and offer quick access to system-level and application-specific functionality. A shortcut interface may display shortcuts that can change depending on which application is active, e.g., which application is in the foreground or has focus. A user can click, tap, or otherwise select shortcuts displayed on the shortcut interface to quickly access corresponding features of the active application and/or system-level features. A shortcut interface can be provided as dedicated hardware device, such as a touchscreen device separate from the device's main display, and/or as a software-based user interface. Examples of shortcut interfaces include the TOUCH BAR provided on certain MACBOOK devices, the WONDER BAR provided on certain computing devices designed to run WINDOWS, along with various types of programmable physical and virtual keyboards.

SUMMARY

Existing devices and systems may restrict use of a shortcut interface such that only the active application can control which shortcuts are displayed thereon. For example, the operating system (OS) may receive a list of shortcuts from the active application and, in turn, may send the list to the shortcut interface. Thus, a user working with multiple applications at a time may only have access to shortcuts for one of those applications, particularly the application deemed by the OS to be in active use. In some cases, this may be the application that has focus within the OS's windowing system and/or the application considered by the windowing system to be in the foreground. To access shortcuts of another application (e.g., a background application), the user may need to first cause the other application to receive focus by, for example, clicking on a window associated with the other application. Such context switching can be time consuming for the user and result in increased resource usage by the OS/device. Embodiments of the present disclosure can eliminate such inefficiencies by allowing for display of shortcuts for both active and inactive applications.

According to one aspect of the disclosure, a method includes: receiving, by a computing device, shortcut commands from a plurality of applications, the shortcut commands provide access to features of different applications of the plurality, and the plurality including both active and inactive applications in execution; generating, by the computing device, a list of shortcut commands in response to a transition of a first application of the plurality from a state of inactive use to a state of active use, the list including a shortcut command from at least one inactive application of the plurality; and causing, by the computing device, display of a user interface that includes the list to enable access to a feature of an inactive application in response to selection of at least one shortcut command of the list.

In some embodiments, the method can further include providing of the list to an active application of the plurality, the active application causing the display of the user interface that includes the list. In some embodiments, the causing of the display of the user interface includes displaying the list on a touchscreen device. In some embodiments, the causing of the display of the user interface includes sending the list to another computing device.

In some embodiments, the method can further include: receiving, by the computing device, a selection from the user interface, the selection being a selection of a shortcut command from the list; determining, by the computing device, an application from the plurality for which the shortcut was received; and sending, by the computing device, the selection to the application to access a feature of the application.

In some embodiments, the list of includes text and images may represent one or more of the shortcut commands. In some embodiments, the plurality of applications can include at least one web application. In some embodiments, the plurality of applications may include at least one application running on a remote computing device. In some embodiments, the generating of the list of shortcut commands may include generating an ordered list of shortcut commands based on a ranking. In some embodiments, the generating of the ordered list can be based on relative positions of windows of the plurality of applications displayed on the computing device.

According to another aspect of the disclosure, an apparatus includes a processor and a non-volatile memory storing computer program code that when executed on the processor causes the processor to execute a process corresponding to the aforementioned method or any described embodiments thereof.

According to another aspect of the disclosure, a non-transitory machine-readable medium encoding instructions that when executed by one or more processors cause a process to be carried out, the process corresponding to the aforementioned method or any described embodiments thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
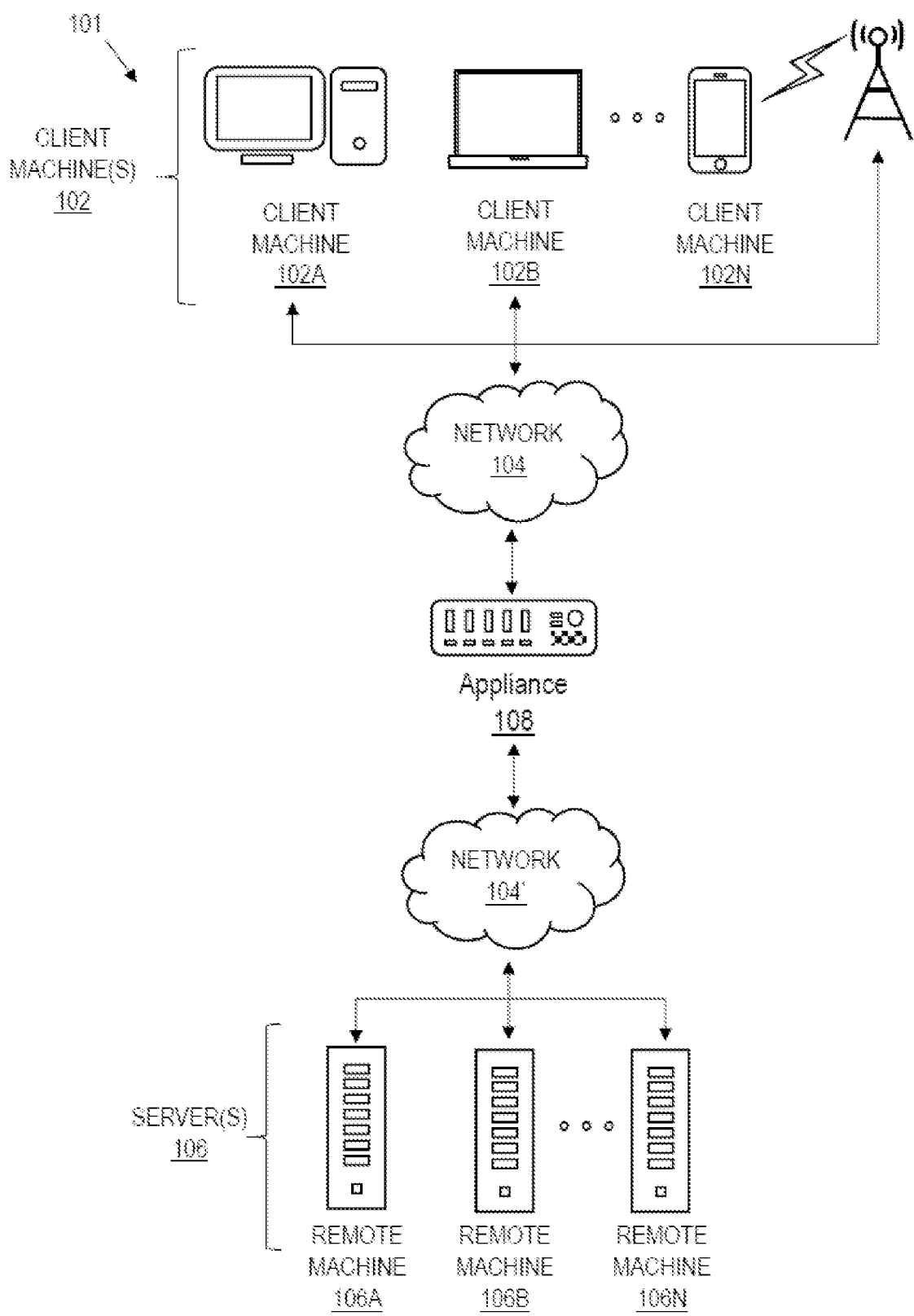
FIG. 1 is a diagram illustrating an example network environment of computing devices in which various aspects of the disclosure may be implemented, in accordance with an embodiment of the present disclosure.

Referring now to FIG. 1, shown is an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
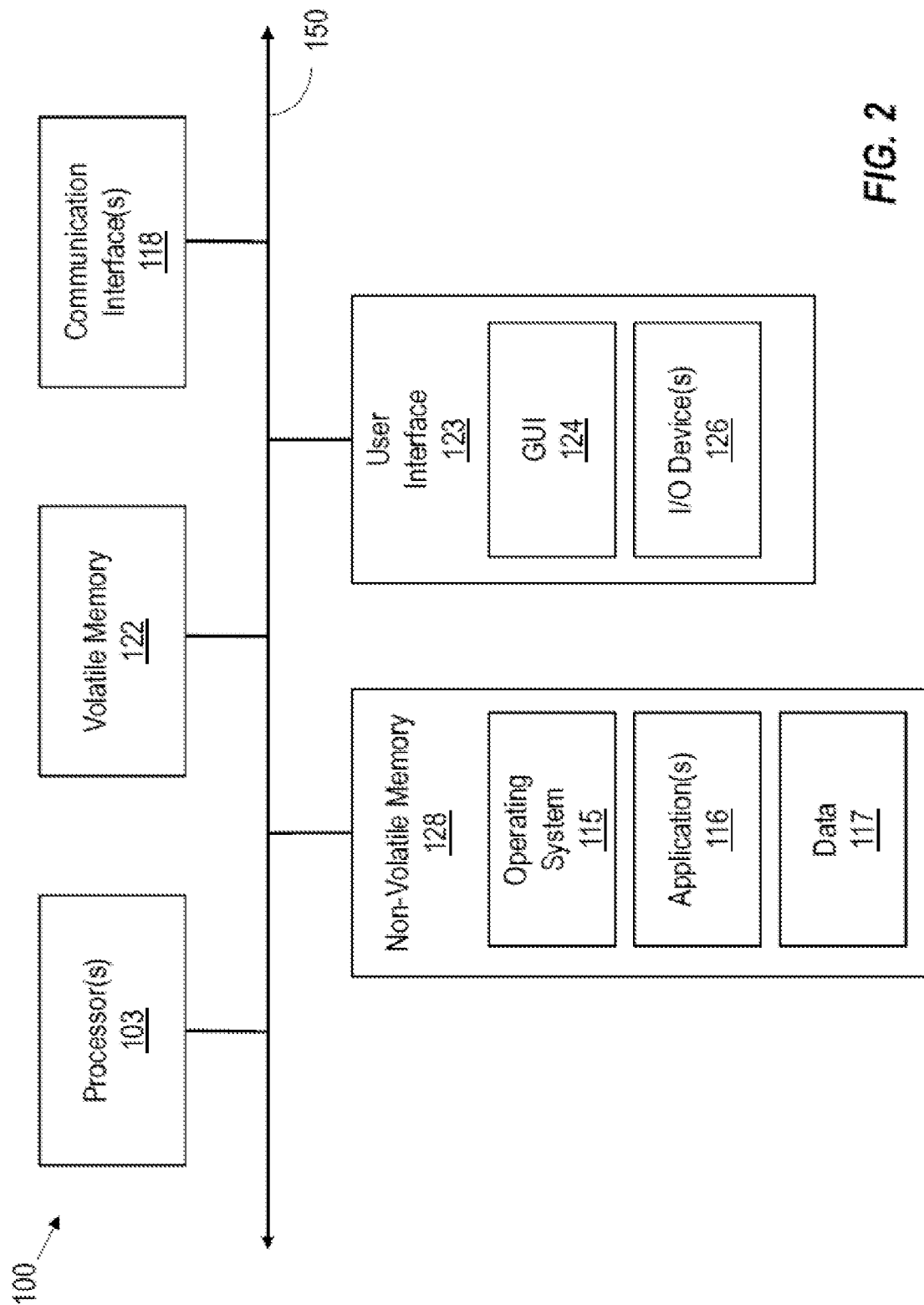
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
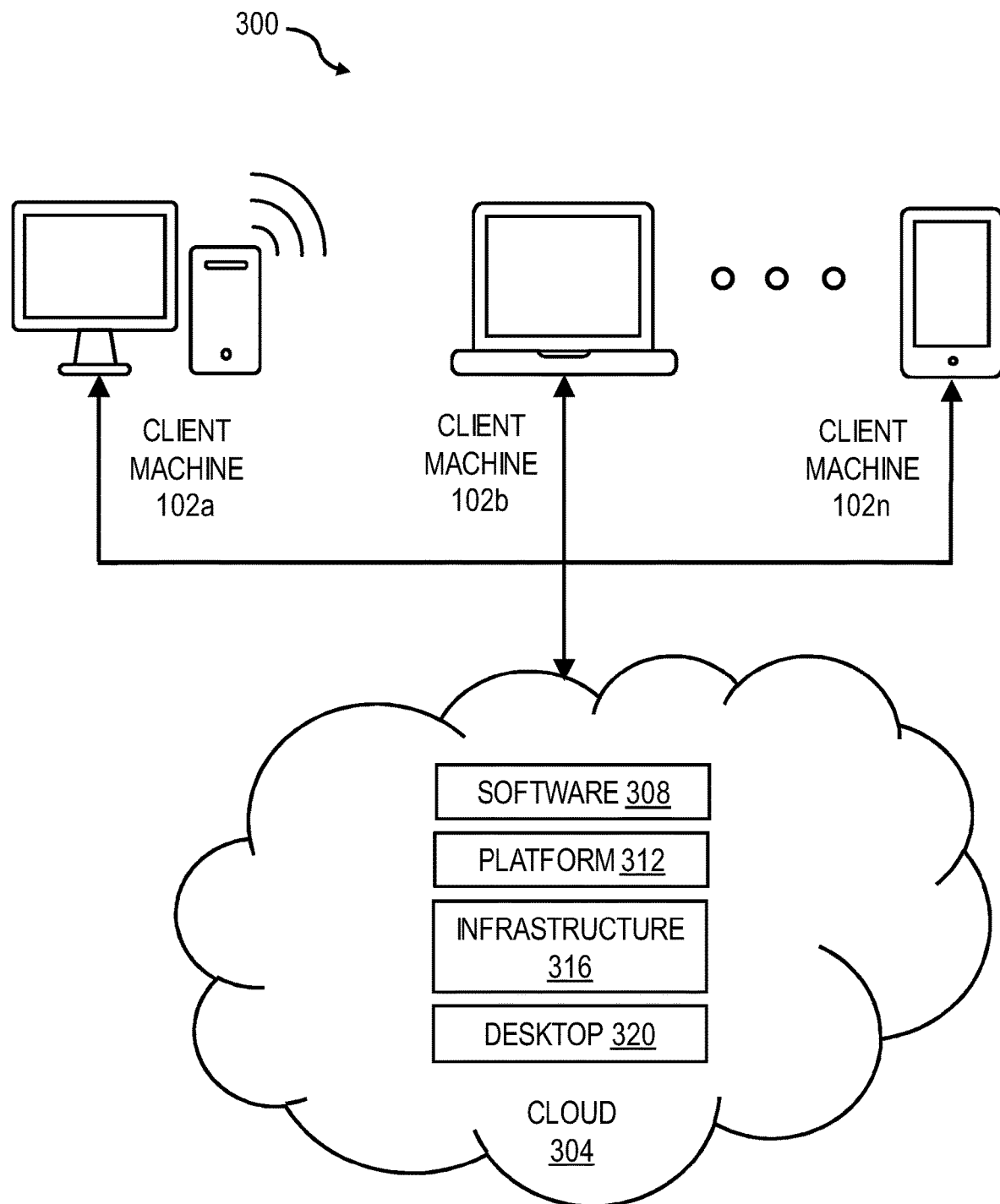
FIG. 3 is a diagram of a cloud computing environment in which various aspects of the concepts described herein may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102a-102n (such as those described above) are in communication with a cloud network 304. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
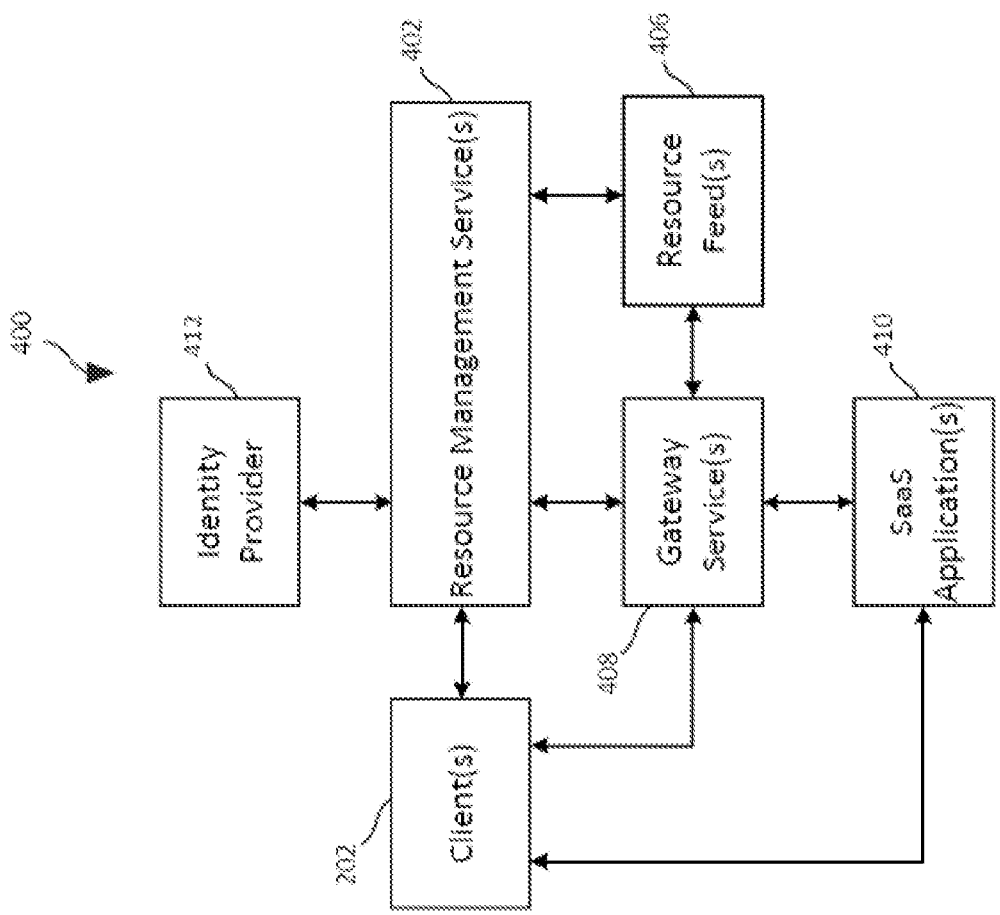
FIG. 4A is a block diagram of an example system in which resource management services may manage and streamline access by clients to resource feeds (via one or more gateway services) and/or software-as-a-service (SaaS) applications.

FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
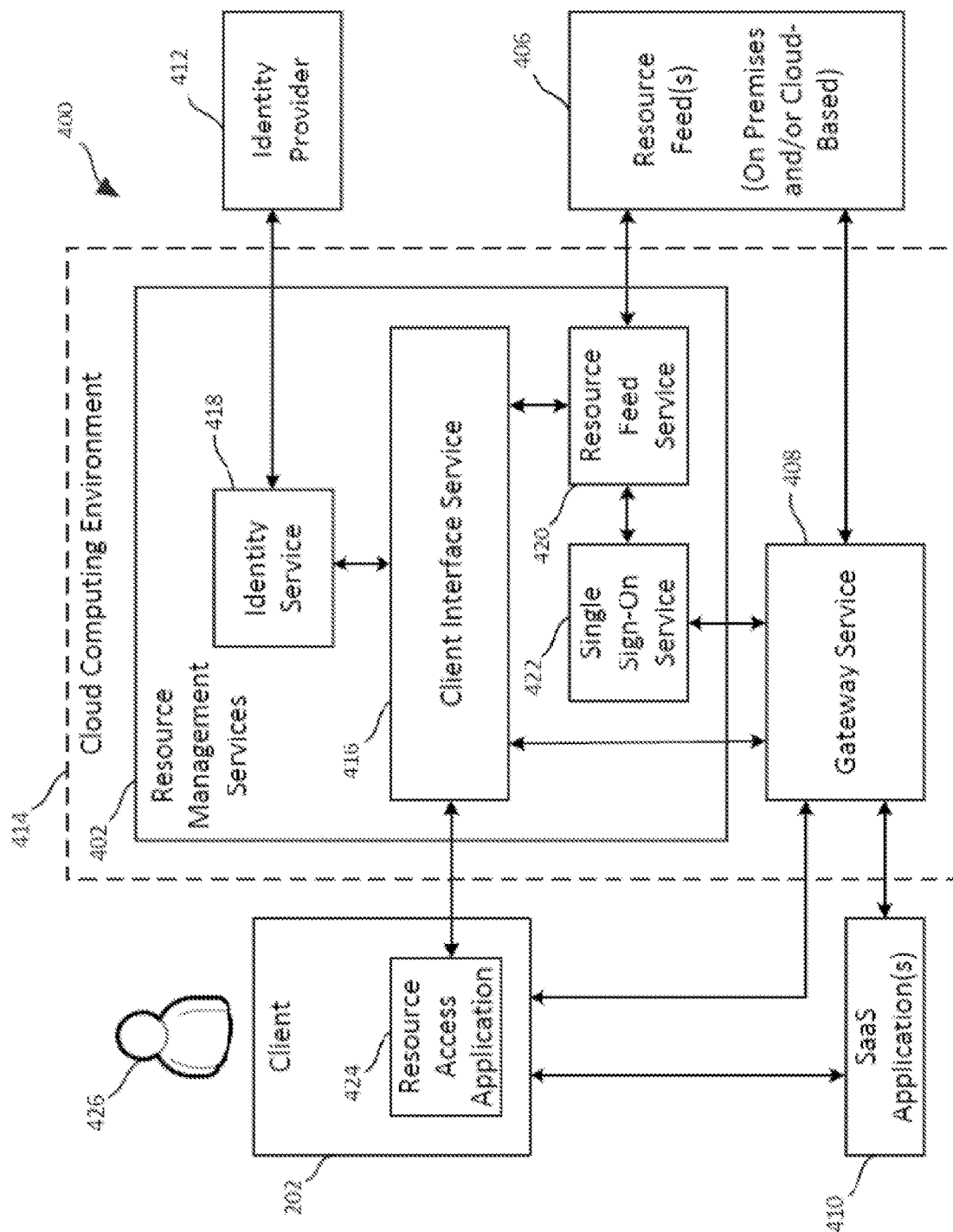
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
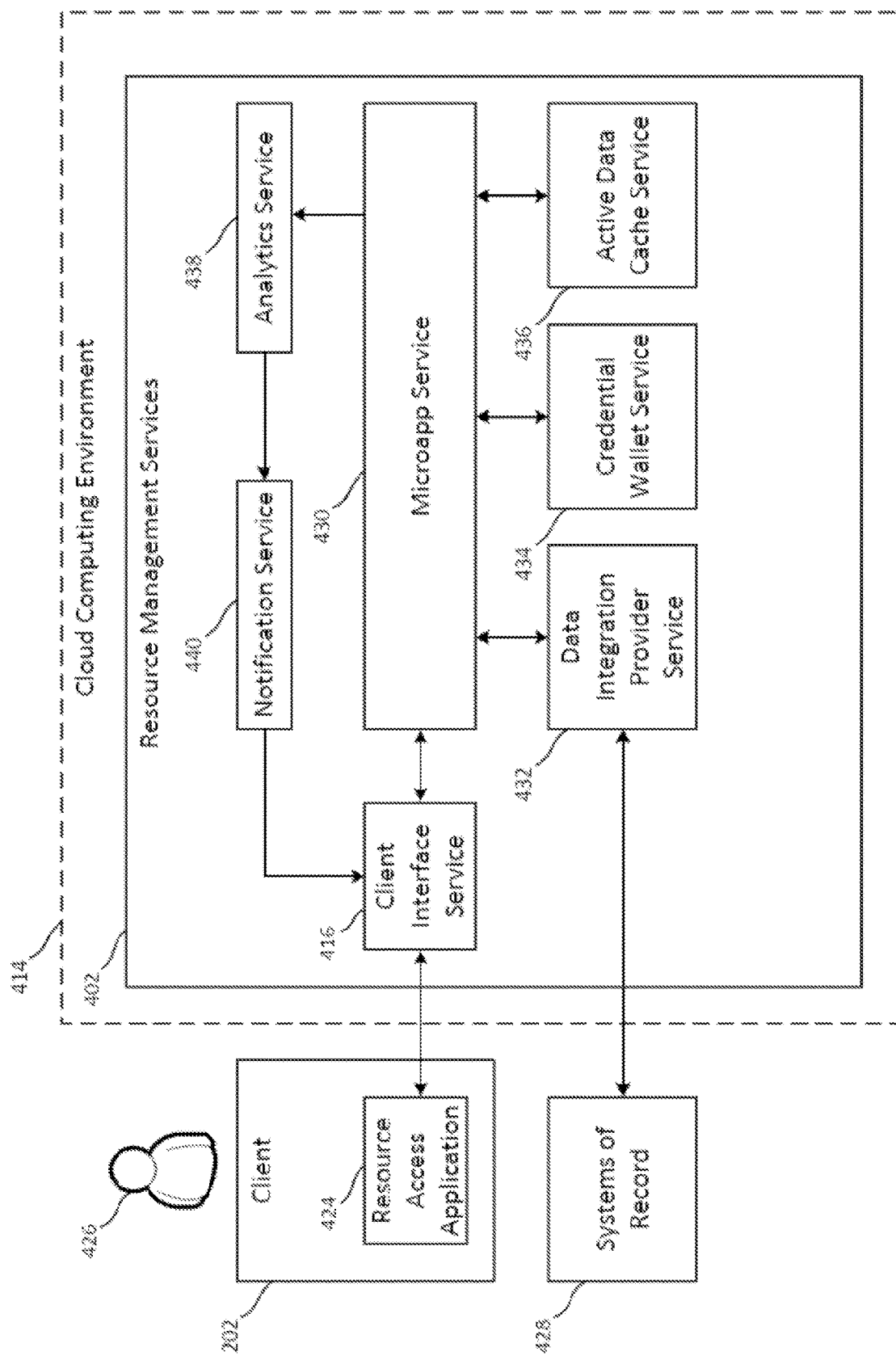
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information being sought.

Figure 5:
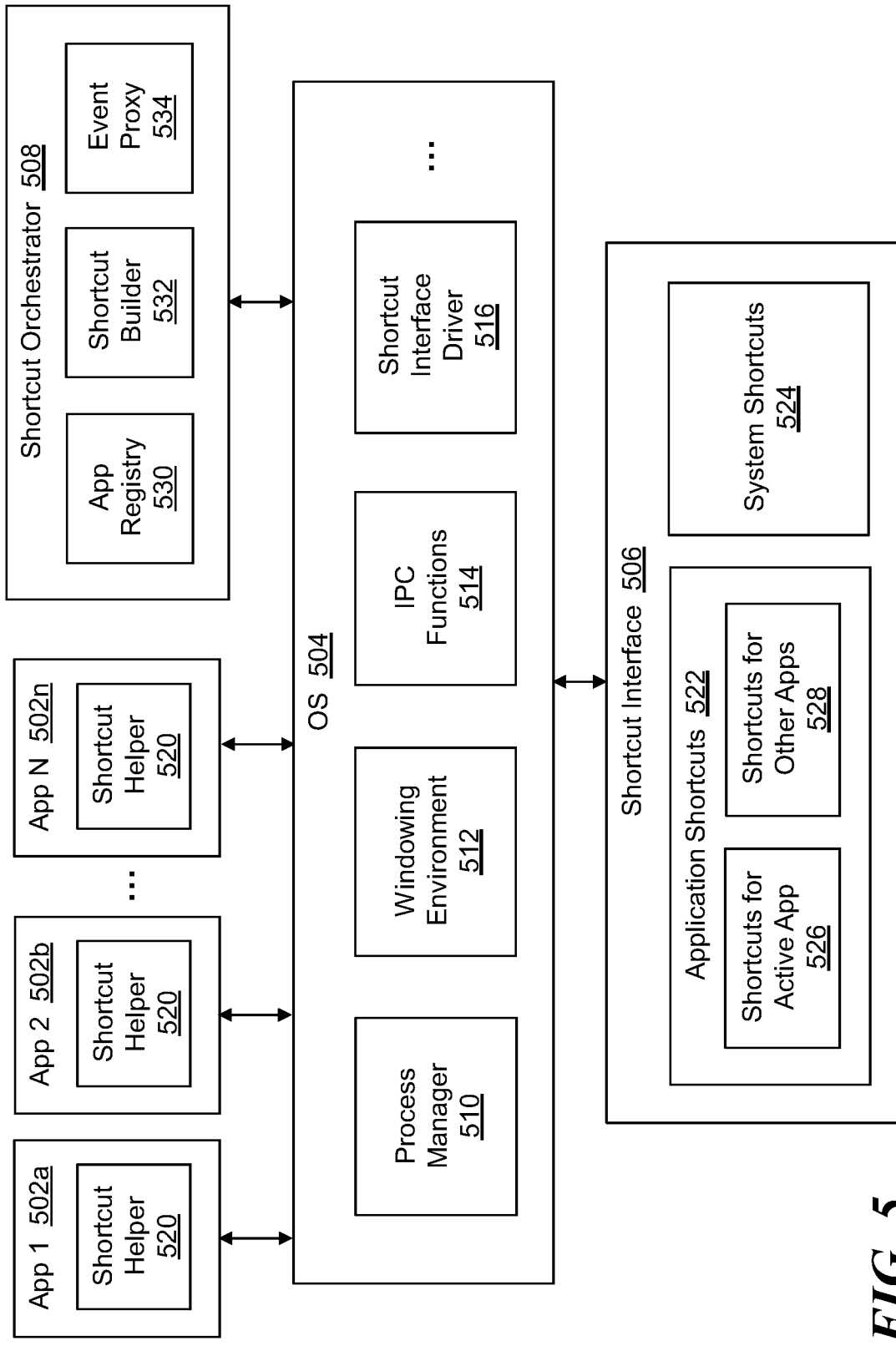
FIG. 5 is a block diagram of a computing device that can provide shortcuts for both active and inactive applications, according to some embodiments.

FIG. 5 shows an example of a computing device 500 that can provide shortcut commands (or "shortcuts") for both active and inactive applications, according to some embodiments. In this disclosure, a shortcut refers to an object that can be represented on a user interface and that, in response to an input on the UI representation, provides access to a feature of an application. The illustrative device 500 may correspond to a client device, such as a desktop, laptop, tablet, or smartphone device. In some embodiments, device 500 may be provided within a networked or cloud computing environment. For example, device 500 may correspond to a client 102A-102N of FIG. 1 and/or of FIG. 3. In some embodiments, device 500 may be provided within a system in which resource management services may manage and streamline access by clients to applications and other resources. For example, device 500 may correspond to the client 202 shown and described above in the context of FIGS. 4A-4C.

The illustrative device 500 can include applications 502a, 502b, . . . , 502n (502 generally), an operating system (OS) 504, and a shortcut orchestrator 508. The device 500 can also include, other otherwise have access to, a shortcut interface 506. Computing device 500 may include various other hardware and software components that, for the sake of clarity, are not show in FIG. 5. For example, device 500 may include at a mouse, trackpad, or other input device; a monitor or other display device; networking components, etc.

Applications 502 and include various types of applications that are running on, or otherwise accessible by, device 500. For example, applications 502 can include native applications (e.g., WINDOWS, LINUX, or MACOS, applications) installed and running on by device 500. As another example, applications 502 can include SaaS applications and web applications that are accessed using a browser running on device 500. As another example, applications 502 can include remote applications or desktops that are accessed using a remote display client (e.g., an RDP, ICA, or HDX client) running on device 500. Such applications/desktops can include virtual application/desktops running in a VDI environment. In some embodiments, a particular application 502 may correspond to an application process, or a group of processes, managed by the OS 504, as discussed further below.

An application 502 may include a shortcut helper library 520 configured to interface with shortcut orchestrator 508 to allow for both active and inactive applications to display shortcuts on shortcut interface 506, as discussed in detail below. In some embodiments, shortcut helper library 520 may be provided as a shared library (e.g., a DLL) that is dynamically linked to applications 502 during startup or execution thereof. In some embodiments, shortcut interface 506 may be statically linked to, or complied into, one or more applications 502.

In some embodiments, a particular one of applications 502 may correspond to a resource access application 424 and other ones of applications 502 may be accessed from and/or managed by the resource access application. For example, a first application 502a in FIG. 5 may be the same as or similar to resource access application 424 of FIG. 4B, and a second application 502b may be the same as or similar to SaaS application 410 of FIG. 4B. In such embodiments, the resource access application can cause the shortcut helper library 520 to be linked to the one or more other applications accessed from/managed by the resource access application. For example, in response to a user input, first application 502a corresponding to the resource access application may use system calls provided by the OS 504 to create a new application process corresponding to second application 502b, and dynamically link the shortcut helper library 520 to the newly created application process. In this way, any application accessed from/managed by the resource access application may be configured to interface with shortcut orchestrator 508 to display shortcuts on shortcut interface 506 regardless of whether they are deemed to be the currently active application/process by OS 504.

OS 504 can include a process manager 510, a windowing environment 512, one or more inter-process communication (IPC) functions 514, and a driver 516 for communicating with the shortcut interface 506. OS 504 can also include various other components not shown for the sake of clarity, such as memory management functions, networking functions, file system components, various other I/O device drivers, etc. Process manager 510 can create and manage application processes running on the computing device 500, including but not limited to processes corresponding to applications 502 and shortcut orchestrator 508. Windowing environment 512 can manage the display of application windows created by applications running on computing device 500 including application windows associated with applications 502. Windowing environment 512 may provide controls for opening, closing, resizing, repositioning, and performing other operation on application windows. Windowing environments are sometimes referred to as window systems or window servers.

Windowing environment 512 may allow multiple application windows to be displayed at the same time including windows associated with multiple different applications 502. Windowing environment 512 may track which application window—and, by association, which application—is an active state of use. For example, windowing environment 512 can track which particular window from among several windows has focus and/or which window is in the foreground. With some windowing environment, only a single window may be active at any given time, and only the active window can receive user inputs (e.g., mouse clicks, keypresses, etc.). That is, windowing environment 512 may receive inputs from one or more devices and can direct those inputs to the active application window (e.g., the window that has focus and/or is in the foreground). For simplicity of explanation, the application associated with the currently active window is referred to herein as the active application or otherwise in active use. Thus, although multiple applications 502 may be running at the same time, for the purpose of this disclosure only a single one of the applications 502 is considered to be "active" or "in active use" at any given time.

IPC functions 514 can include implementations of one or more system calls to enable communication between processes running on computing device 500, including communication between two or more of the applications 502 and communication between applications 502 and shortcut orchestrator 508. Non-limiting examples of IPC functions that can be implemented by IPC functions 514 include named pipes, sockets, shared memory, and message passing. In some embodiments, IPC functions 514 may include an implementation of the XPC framework for MACOS.

Shortcut interface 506 may correspond to any hardware device or software component that can be dynamically configured to display shortcuts and to allow a user to touch, tap, press, click on, or otherwise select particular shortcuts displayed thereon. Shortcut interface 506 may display a user interface that includes a list of shortcuts to enable access to application-specific and/or system-level features in response to selections of the shortcuts. In some embodiments, shortcut interface 506 may be a touchscreen device that is integrated into or otherwise connected to computing device 500. For example, shortcut interface 506 may correspond to a TOUCH BAR, a WONDER BAR, or a similar type of touchscreen device capable of displaying shortcuts. In some embodiments, shortcut interface 506 may correspond to a physical or virtual keyboard wherein the appearance and/or behavior of keys can be dynamically configured. In some embodiments, shortcut interface 506 may correspond to another computing device (e.g., a smartphone or tablet device) that is paired with computing device 500 such that when a user selects shortcuts on the other computing device, the selections are sent to and processed by computing device 500.

Shortcut interface 506 can display various types of shortcuts commands provided by applications 502. For example, a given application 502 may provide a shortcut to access notifications within the application, or may display the contents of one or more notifications directly within the shortcut interface 506. Such shortcuts, referred to herein as "notification shortcuts," can be particularly helpful in the case of a resource access application that aggregates notifications across multiple other applications (e.g., across multiple SaaS applications). As another example, an application 502 may provide shortcuts to access various features or functionality of the application.

OS 504 may provide one or more system calls via which applications 502 can provide lists of shortcuts for display on shortcut interface 506. For example, in the case of MACOS, OS 504 may provide functions that can be used by applications 502 for instantiating an NSTouchBar object and corresponding NSTouchBarItem objects representing shortcuts. OS 504 can receive different lists of shortcuts from different applications 502 and OS 504 can determine which of the lists is displayed on shortcut interface 506. For example, OS 504 may only determine that only shortcuts received from the currently active application should be displayed, where the active application is tracked by windowing environment 512. That is, OS 504 may restrict use of the shortcut interface 506 such that only the application in an active state of use can control which shortcuts are displayed thereon. OS 504 may send the list of shortcuts to shortcut interface 506 via driver 516.

In some embodiments, OS 504 may send one or more system-level (or "default") shortcuts to shortcut interface 506 in additional to the list of application-specific shortcuts.

Non-limiting examples of system-level shortcuts include audio control shortcuts, display control shortcuts, and power control shortcuts. OS 504 may detect when the active application changes (e.g., when a particular application transitions from a state of inactive use to a state of active use) and, in response, may cause the list of shortcuts associated with the newly active application to be displayed on shortcut interface 506.

In response to a user clicking, tapping, or otherwise selecting a shortcut command displayed on shortcut interface 506, OS 504 may receive the selection via driver 516. The selection may be received as an event object (e.g., a data structure representing to a touch event, such as an NSTouch object) having one or more attributes that can be used to identify, for example, the particular shortcut command that was selected and/or whether the shortcut command is a system-level shortcut or an application-specific shortcut. In some embodiments, attributes (e.g., event object attributes) may identify which application 502 the shortcut is associated with. OS 504 can use such information to determine how to handle the shortcut selection. For example, if the selection corresponds to an application-specific shortcut, OS 504 can notify the active application, or an application identified by the attributes, of the shortcut selection. In some embodiments, applications 502 may register one or more functions (e.g., callback functions) to be invoked in response to a shortcut selection, where a function performs (or causes to be performed) one or more actions associated with or otherwise assigned to the selected shortcut. In this case, OS 504 may cause a particular function to be invoked in response to receiving a selection from shortcut interface 506. As a simple example, assume that first application 502*a* is a word processing application that provides a shortcut for making text bold and another shortcut for making text italicized. First application 502 may define separate functions for these shortcuts and OS 504 may determine which function to invoke based on whether the user selected the shortcut for making text bold or the shortcut for making text italicized.

Shortcut orchestrator 508 can interoperate with applications 502 to enable shortcuts for both active and inactive applications to be displayed on shortcut interface 506. In more detail, multiple applications 502 including the active application and inactive applications can generate lists of shortcuts and send the respective lists of application-specific shortcuts to shortcut orchestrator 508 using an IPC mechanism. For example, the shortcut helper library 520 linked to an application 502 may utilize IPC functions 514 provided by the OS 504 to send a list of shortcuts to shortcut orchestrator 508. A given application 502 can send its list of shortcuts to shortcut orchestrator 508 at startup and may subsequently send updated lists of shortcuts in response to user actions. For example, a web browser may update its shortcuts when a user changes tabs (e.g., when the user switches between two different SaaS applications running in the browser). As another example, an email application may update its list of shortcuts when a user switches between email messages being viewed, so as to display shortcuts that are relevant to the content or context of the email message currently being viewed. For example, if a user is viewing an email regarding paid time off (PTO), the email application may update its shortcut list to include a shortcut to access a PTO application.

A list of shortcuts can include one or more attributes for individual shortcuts, such as: a textual name or description to be displayed by shortcut interface 506; an icon image to also be displayed by shortcut interface 506; and an attribute to specify the type of control (e.g., a button, a slider, etc.) to be used when displaying shortcut on shortcut interface 506. The attributes of a shortcut may also include information that can be used to identify the application with which the shortcut is associated. For example, the attributes may include a process identifier or a filesystem path to the application executable files/directories. In the case of OSX, bundle identifiers may be used to uniquely identify applications. In some embodiments, the attributes for a shortcut can include an attribute specifying whether the shortcut is a notification shortcut versus another type of shortcut.

In some embodiments, shortcut orchestrator 508 may be configured to run as a service (e.g., a daemon process) of computing device 500. Using a launch agent provided by OS 504, the shortcut orchestrator service may be set to start automatically when computing device 500 is powered on and may be set to automatically restart in the event it terminates unexpectedly. Shortcut orchestrator 508 may initialize an IPC mechanism at startup to enable communication from applications 502. For example, in the case of MACOS, shortcut orchestrator 508 may instantiate an NSXPCService object to listen for incoming XPC connections from applications 502. Individual applications 502 can instantiate an NSXPCConnection object to establish an XPC connect with shortcut orchestrator 508. In some embodiments, shortcut helper library 520 linked to a particular application 502 may initiate IPC with shortcut orchestrator 508 during startup of the application. XPC is just one example of an IPC mechanism can be used to enable communication between applications 502 and shortcut orchestrator 508. Shortcut orchestrator 508 can maintain IPC connections with applications 502 for the lifetime of the applications 502 to allow bidirectional communication.

In addition to lists of shortcuts, applications 502 may also send status updates to shortcut orchestrator 508. For example, when an application 502 becomes the active application (e.g., when it gains focus within windowing environment 512), the application 502 may notify shortcut orchestrator 508 using IPC. In this way, shortcut orchestrator 508 is able to track the currently active application. In some embodiments, shortcut orchestrator 508 can send the list of combined shortcuts to an application in response to the application notifying shortcut orchestrator 508 that it is the active application.

Shortcut orchestrator 508 can receive lists of shortcuts from multiple applications 502 and generate a list of combined shortcuts that includes shortcuts for both the active application and one or more inactive applications. Shortcut orchestrator 508 can then send the combined list of application shortcuts to the active application using IPC. As previously mentioned, shortcut orchestrator 508 can track the currently active application and IPC connections to the multiple applications 502, thereby allowing it to send the combined list of shortcuts to the active application via the corresponding IPC connection. The active application, or the shortcut helper library 520 linked thereto, can receive the combined list of shortcuts and can cause some or all of those shortcuts to display on shortcut interface 506 (e.g., by constructing an NSTouchBar object as previously discussed). Thus, as illustrated in FIG. 5, the structures and techniques disclosed herein cause shortcut interface 506 (e.g., a touch bar) to display application shortcuts 522 that include shortcuts 526 for the active application in addition to shortcuts 528 for other, inactive applications. Shortcut interface 506 may also display system-level shortcuts 524 that are specified, for example, by the OS 504.

In some embodiments, an application 502 may be configured to query shortcut orchestrator 508 for the combined list of application shortcuts, for example in response to the application detecting that it is the active application. With this approach, shortcut orchestrator 508 may not maintain open IPC connections with applications 502.

Depending on the number of applications 502 and the number of shortcuts in each of the application-specific shortcut lists, the number of shortcuts in the combined list may exceed the number that can be displayed by shortcut interface 506. In this case, shortcut interface 506 may not display certain shortcuts or may relegate them to a secondary screen/interface that requires additional clicks/taps to access. For example, a user may have to expand or scroll the shortcut interface 506 to view certain application shortcuts. Thus, in some embodiments, shortcut orchestrator 508 may generate the combined list of shortcuts using rules or criteria that seek to prioritize certain shortcuts. For example, shortcut orchestrator 508 may only take the first N shortcuts in each application-specific shortcut list when building the combined list. As another example, shortcut orchestrator 508 may assign a priority value or ranking to each of the application shortcuts and then order the shortcuts by priority to generate the combined list. The ordered list can then optionally be truncated such that only the M highest priority shortcuts remain. In some cases, shortcuts associated with the active application may be assigned a higher priority than shortcuts associated with inactive applications. In some cases, notification shortcuts may be assigned a higher priority than other types of shortcuts. In some cases, shortcuts may be prioritized based on how recently the corresponding applications were used.

Any or all of the rules and criteria described above for ranking/prioritizing shortcuts may alternatively or additional be performed by the active application after receiving the combined list of shortcuts from shortcut orchestrator 508. For example, the active application may cause its own shortcuts to be displayed more prominently than those of other applications, regardless of the order specified within the combined list of shortcuts. In some embodiments, the active application may cause shortcuts for multiple applications 502 to be displayed in a rotating or alternating fashion. For example, if the number of shortcuts in the combined list exceeds the number that can be displayed by shortcut interface 506, the active application may display a subset of the shortcuts for a given period of time before displaying another subset for the given period of time, and so on.

In response to a user selecting a shortcut displayed within shortcut interface 506, the active application may receive an object (e.g., an event object by invocation of a callback function, as also previously discussed). The active application can then send (or "forward") the object, or another data structure representative thereof, to shortcut orchestrator 508 using IPC. In response, shortcut orchestrator 508 can identify the application with which shortcut is associated by, for example, by comparing one or more attributes of the object to the different lists of shortcuts received from applications 502. For example, the object may include attributes defined for the shortcut by the application that sent the shortcut and/or by the shortcut orchestrator 508. As previously discussed, such attributes can include information that can be used to identify the application with which the shortcut is associated. For example, the attributes may include a process identifier or a filesystem path to the application executable files/directories. In the case of OSX, bundle identifiers may be used to uniquely identify applications. Any attribute or combination of attributes within the object may be used to identify the application with which the shortcut is associated. The shortcut orchestrator 508 can then send/forward the object or representation thereof to the identified application. For example, the shortcut orchestrator 508 may use an IPC connection previously initiated by the identified application. Upon receipt of the object, the identified application can perform one or more actions associated with the selected shortcut. In the case where the selected shortcut is associated with the active application, the active application may directly perform the shortcut command rather than sending the object to the shortcut orchestrator 508.

As shown in FIG. 5, shortcut orchestrator 508 may include one or more submodules, such as an application registry 530, a shortcut builder 532, and an event proxy 534. Application registry 530 can track information about one or more applications 502 running on computing device 500. For example, application registry 530 can maintain (e.g., in memory and/or on disk) lists of shortcuts received from different applications 502. As another example, application registry 530 can maintain objects (e.g., NSXPCConnection objects) initiated by applications 502. In some embodiments, application registry 530 can maintain a mapping between shortcuts (e.g., data structures representing application shortcuts) and IPC connections such that when a user selects a particular shortcut using shortcut interface 506, shortcut orchestrator 508 can forward the corresponding object (e.g., an event object) to the appropriate application for handling. Application registry 530 can also track which application 502 is the active application. In some embodiments, to distinguish between applications 502, application registry 530 can using one or more identifiers that are unique within computing device 500. For example, application registry 530 can identify applications 502 using process identifiers or filesystem paths to the application executable files/directories. In the case of OSX, bundle identifiers may be used to uniquely identify applications. In other embodiments, application registry 530 can use objects (e.g., IPC connection objects) to distinguish between applications 502. When an application terminates, application registry 530 can delete, release, or otherwise free up any resources being used to track the application, such as any lists of shortcuts received from the application and any objects (e.g., IPC connection objects) associated with the application. For example, shortcut orchestrator 508 can use one or more system calls provided by OS 504 and, more particularly, by process manager 510 to detect when an application process terminates. In the case of WINDOWS, the win32_processStopTrace class may be used to detect when an application process terminates.

Shortcut builder 532 can use the lists of application-specific shortcuts maintained by 530 to generate a list of combined shortcuts that includes shortcuts for both the active application and one or more inactive applications. Various techniques for generating the list of combined shortcuts are described above. Shortcut builder 532 may also handle sending of the list of combined shortcuts to the active application using IPC. The active application can then cause one or more of the shortcuts in the combined list to display on shortcut interface 506 (e.g., by constructing a NSTouchBar object having one or more NSTouchBarItem objects).

Event proxy 534 can receive objects (e.g., event objects representing touch events) from the active application via IPC in response to a user selecting a shortcut command on shortcut interface 506. Event proxy 534 can identify which of multiple applications 502 the shortcut is associated with (or "belongs to") and forwards the object (e.g., event object) to that application. Event proxy 534 can use information maintained by application registry 530 to identify the application. For example, event proxy 534 can use a mapping between shortcuts (e.g., data structures representing application shortcuts) and IPC connections maintained by application registry 530.

In some embodiments, the disclosed functionality of shortcut orchestrator 508 may be partially or wholly implemented within one of the applications 502. For example, the functionality of shortcut orchestrator 508 may be implemented within a resource access application that launches/manages other applications. As another example, the functionality of shortcut orchestrator 508 may be implemented within the shortcut helper library 520 linked to multiple different applications 502 such that any of those applications can act as the shortcut orchestrator 508. An election algorithm may be used to determine which of multiple applications 502 is the acting shortcut orchestrator. In such embodiments, applications 502 may communicate directly with each other using IPC.

By allowing for display of shortcuts commands for active and inactive applications, computing device 500 enables various use cases. For example, if a user is actively using a web browser and has a resource access application (e.g., CITRIX WORKSPACE) running in the background, shortcut interface 506 can display shortcuts for accessing notifications within the resource access application. As another example, if the user is actively using the resource access application, shortcut interface 506 can display shortcuts for functionality in various applications (e.g., web applications, SaaS applications, remote desktops applications, etc.) managed by or otherwise associated with the resource access application.

Figure 6A:
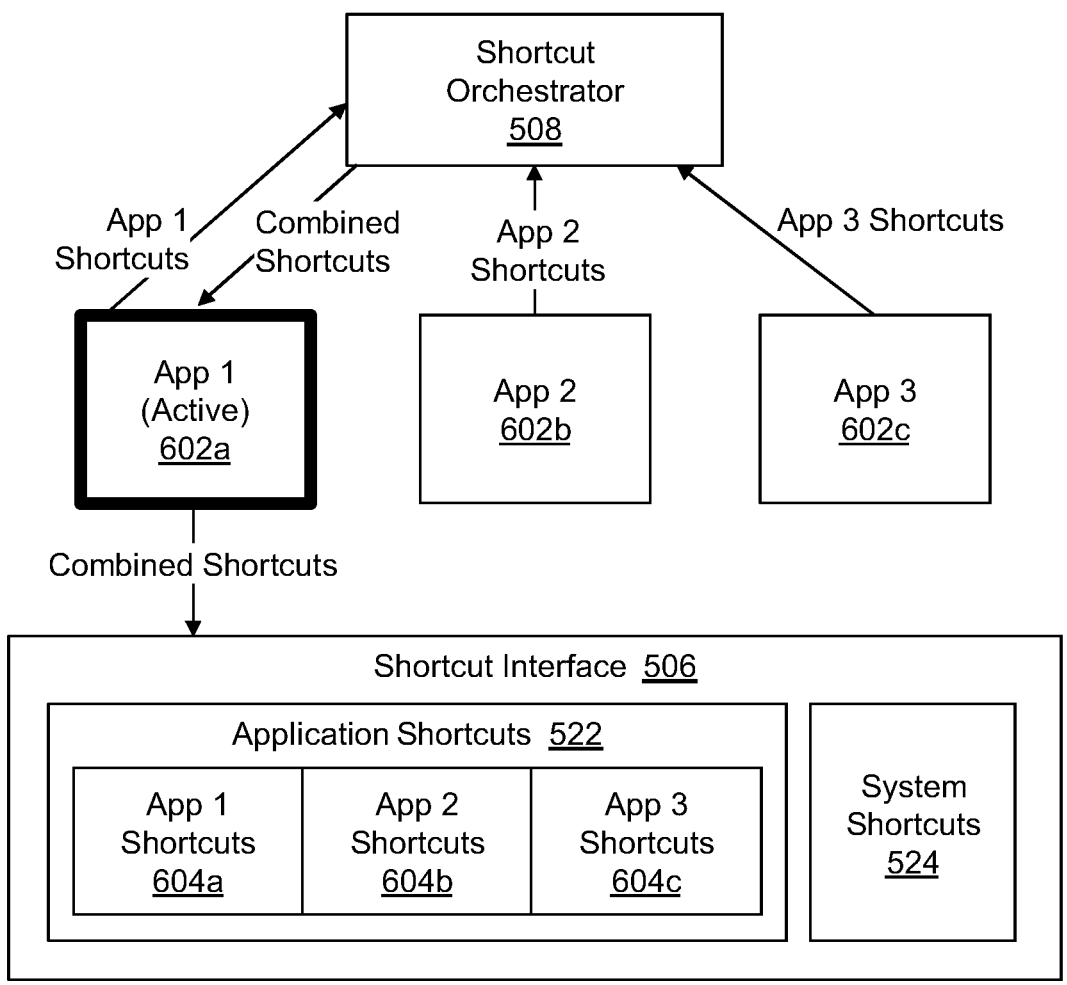
FIGS. 6A and 6B are diagrams illustrating how shortcuts for both active and inactive applications can be displayed on a shortcut interface.
Figure 6B:
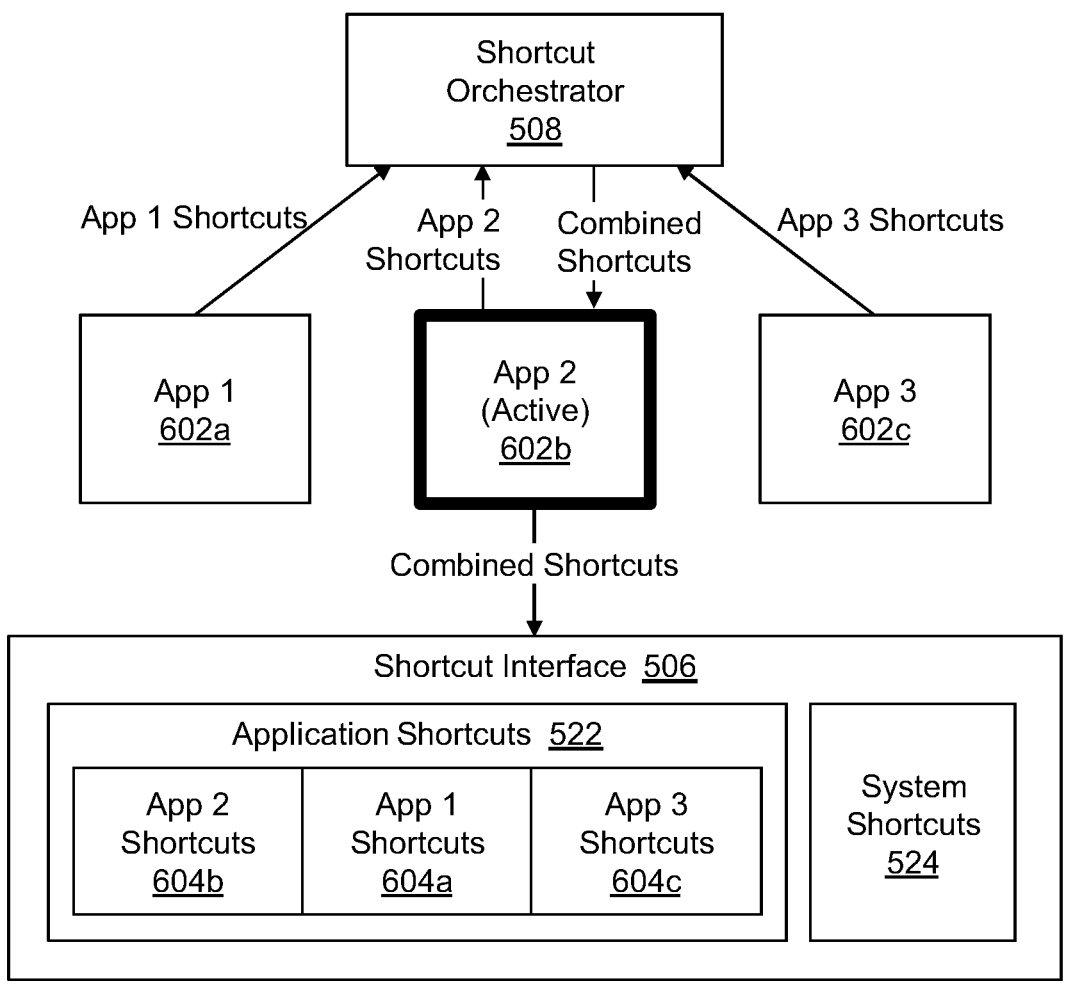

FIGS. 6A and 6B illustrate how shortcuts for both active and inactive applications can be displayed on a shortcut interface, according to some embodiments. Like elements in FIGS. 5, 6A, and 6B are identified using like reference numerals.

Referring to both FIG. 6A and FIG. 6B, an illustrative computing device 600 is shown as having a plurality of applications 602a, 602b, 602c (602 generally), a shortcut interface 506, and a shortcut orchestrator 508. Various other hardware and software components of computing device 600 are omitted from the drawings for the sake of clarity. Computing device 600 may restrict use of the shortcut interface 506 such that only an application in an active state of use can control which shortcuts are displayed thereon. For example, computing device 600 may run MACOS or another OS that imposes such restrictions.

In the example of FIG. 6A, a first application 602a is assumed to be the active application, meaning that it has focus or is otherwise in a state of active use. A second application 602b and a third application 602c are both inactive. As shown, applications 602a, 602b, 602c may send respective lists of application-specific shortcuts to shortcut orchestrator 508. First application 602a may also notify shortcut orchestrator 508 that it is the active application. Shortcut orchestrator 508 can generate a list of combined shortcuts based on the received lists of application-specific shortcuts and provide the combined list of shortcuts to the active, first application 602a. The first application 602a can then cause one or more shortcuts from the combined list to display on shortcut interface 506. For example, as shown in FIG. 6A, shortcut interface 506 can display application shortcuts 522 that include first shortcuts 604a associated with first application 602a, second shortcuts 604b associated with second application 602b, and third shortcuts 604c associated with third application 602c.

In some cases, the shortcut orchestrator 508 and/or the active application may cause shortcuts associated with the active application to be displayed more prominently on shortcut interface 506. For example, as illustrated in FIG. 6A, first shortcuts 604a associated with the active, first application 602a may be displayed before second and third shortcuts 604b, 604c (e.g., first shortcuts 604a may be displayed to the left of second and third shortcuts 604b, 604c within a horizontal user interface layout such as provide by some touch bars). As another example, first shortcuts 604a may be displayed on a primary screen/interface of shortcut interface 506 whereas second and third shortcuts 604b, 604c may be relegated to a secondary screen/interface. As another example, first shortcuts 604a may be displayed using a relatively larger font size or image size, or using a border.

In some embodiments, the order in which shortcuts are displayed on the shortcut interface may be selected based on the relative positions of application windows displayed by the computing device. For example, if a window of a first application is positioned to the left of a window of a second application, shortcuts of the first application may be displayed to the left of the shortcuts of the second application. In the case where there are multiple monitors connected to the computing device, and one monitor is configured to be to the left/right of another monitor, the configured positions of the monitors may be considered when selecting the order of shortcuts. For example, shortcuts for an application displayed on the left monitor may be displayed to the left of shortcuts for an application displayed on the right monitor.

In the example of FIG. 6B, it is assumed that second application 502b is the active application. For example, the focus of a windowing environment provided by computing device 600 may change from the first application 502a to the second application 502a in response to some user action. The second application 602b can notify shortcut orchestrator 508 that it is now the active application and, in response, shortcut orchestrator 508 may provide a combined list of application shortcuts to second application 602. Second application 602 can then cause one or more of the shortcuts in the combined list to display on shortcut interface 506. As previously mentioned, in some cases shortcut orchestrator 508 and/or the active application may cause shortcuts associated with the active application to be displayed more prominently on shortcut interface 506. For example, as illustrated in FIG. 6B, second shortcuts 604b associated with the active, second application 602b may be displayed before first and third shortcuts 604a, 604c.

Figure 7:
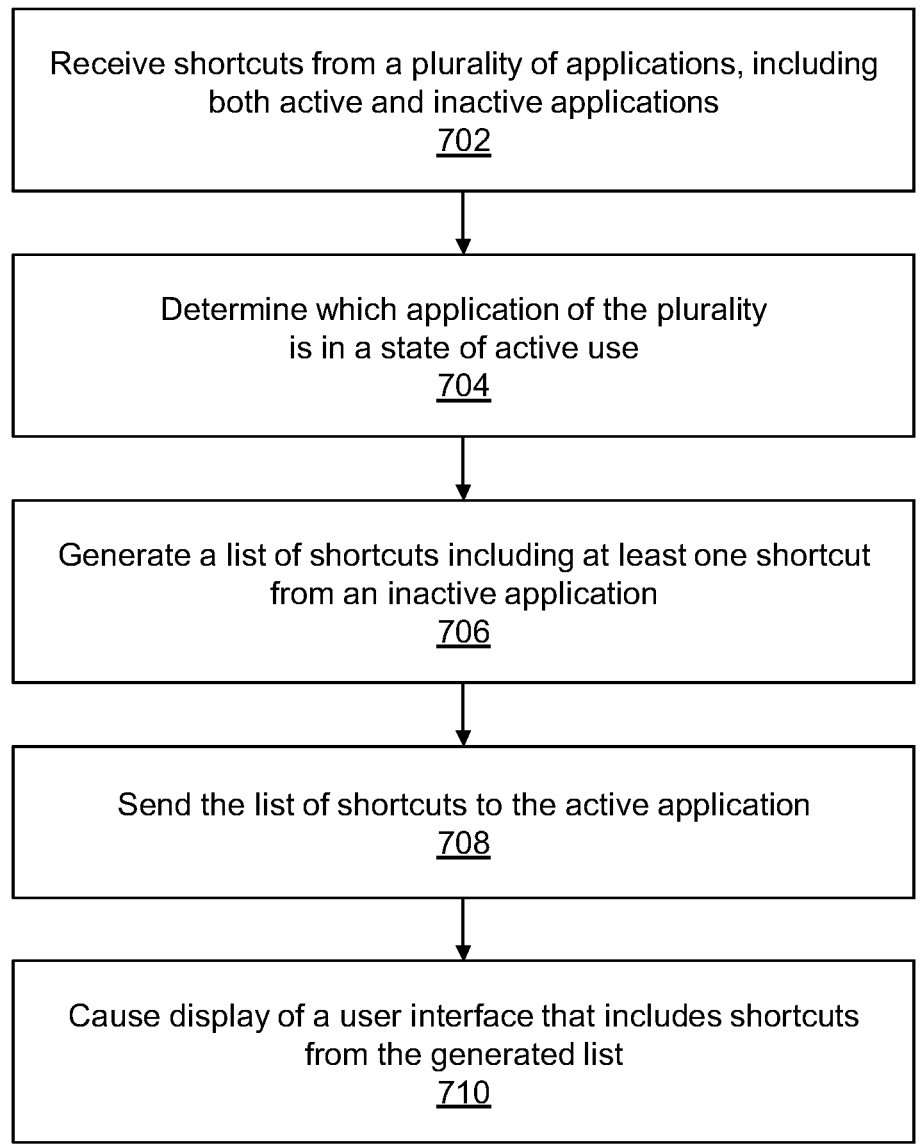
FIG. 7 is a flow diagram showing a process for displaying shortcuts for both active and inactive applications, according to some embodiments.
Figure 8:
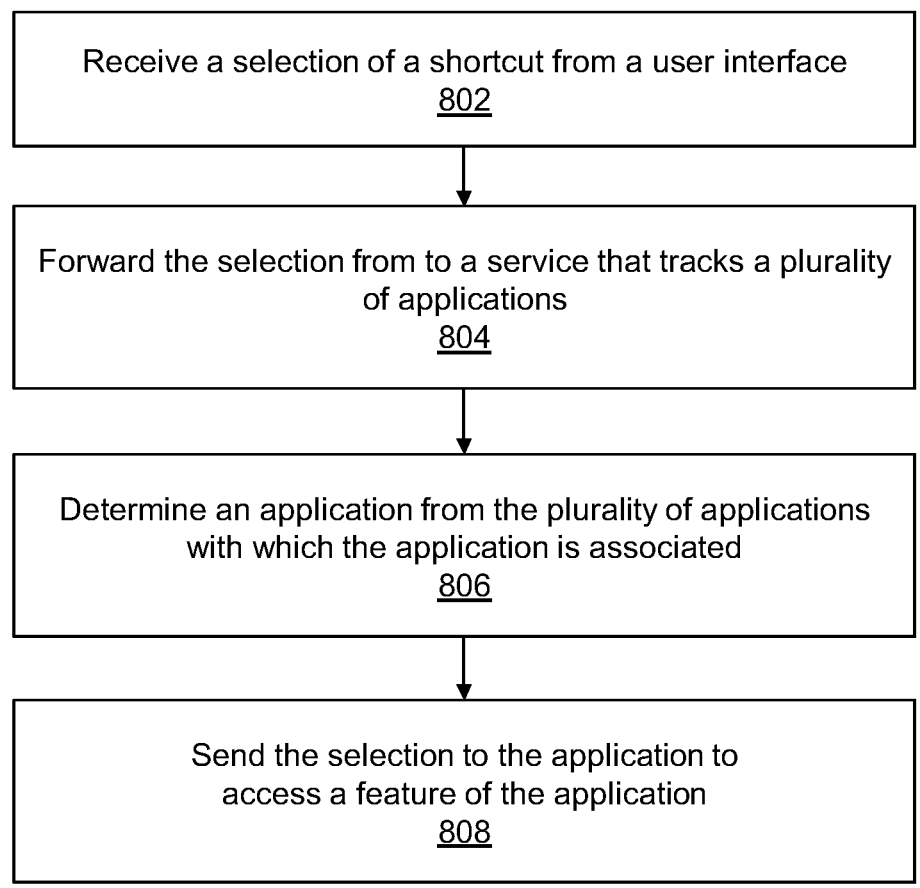
FIG. 8 is a flow diagram showing a process for handling the selection of shortcuts for both active and inactive applications, according to some embodiments.

FIGS. 7 and 8 show illustrative processes that can be implemented and performed by a computing device, such as computing device 500 of FIG. 5. In more detail, the processing may be implemented and performed by a service or daemon process running on the computing device, such as shortcut orchestrator 508 of FIGS. 5, 6A, and 6B. Additionally or alternatively, at least some of the processing may be implemented within a library linked to one or more applications running on the computing device, such as shortcut helper library 520 of FIG. 5.

FIG. 7 shows an illustrative process 700 for displaying shortcuts for both active and inactive applications. At block 702, shortcuts can be received from a plurality of applications, the plurality including both active and inactive applications in execution on the computing device. In some cases, an active application may be an application that has focus within a windowing environment or otherwise in active use. The applications can include various types of applications such as desktop applications, remote applications, web applications, and SaaS applications. In some embodiments, one of the applications may correspond to a resource access application, such as CITRIX WORKSPACE. Shortcuts can be received from a particular application using an IPC mechanism, such as an XPC connection or other type of IPC connection. In some embodiments, IPC connections initiated by the applications may be maintained (e.g., kept alive) to for sending of information back to the applications, as discussed below.

A received shortcut can be represented by (e.g., stored in memory using) a data structure having one or more attributes, such as a textual name or description for the shortcut, an icon image for the shortcut, a control type to be used when displaying shortcut, an attribute specifying whether the shortcut is a notification shortcut versus another type of shortcut. In some embodiments, ordered lists of shortcuts may be received from ones of the plurality of applications. The received shortcuts can include notification shortcuts and other types of shortcuts. In some embodiments, the data structure can also include information identifying the application from which a shortcut was received, such as the application name.

At block 704, a determination can be made as to which application of the plurality is in a state of active use. In some embodiments, an application may send a notification when it transitions from a state of inactive use to a state of active use (e.g., when it receives focus). In other embodiments, determining which application is active may involve querying a process manager and/or windowing environment of the computing device or subscribing to/listing for events generated thereby.

At block 706, a list of shortcuts can be generated based on the shortcuts received from the plurality of applications. The generated list can include multiple shortcuts including at least one shortcut received from an inactive application. In some embodiments, the list of shortcuts may be generated in response to a change in the active application (e.g., in response to an application sending a notification that it is active). In some embodiments, the list of shortcuts can be generated, or regenerated, in response to receiving updated shortcuts from one or more of the plurality of applications. In some embodiments, the list of shortcuts can be generated as an ordered list of shortcuts based on a ranking or using other rules or criteria that seek to prioritize certain shortcuts. Illustrative techniques that can be used to prioritize shortcuts are described above in the context of FIG. 5.

In some embodiments, if two shortcuts received from two different applications are visually similar or identical when displayed (e.g., have the same or similar textual name/description or icons), then one or both of the "duplicate" shortcuts may be modified during generation of the list of shortcuts so that they are visually distinguishable. For example, a textual name or description of a shortcut may be modified to include (e.g., prepend) the name of the application from which the shortcut was received. As another example, the shortcut's icon may be modified to indicate which the associated application. In other embodiments, duplicate shortcuts may be excluded from the generated list.

At block 708, the generated list of shortcuts can be sent to the active application using, for example, an IPC connection previously initiated by the active application (e.g., an IPC connection maintained from block 702). In some embodiments, the list of shortcuts may be generated by the active application itself and, thus, block 708 may be omitted.

At block 710, the computing device can cause display of a user interface that includes the list of shortcuts to enable access to features (e.g., notifications and/or other features) of both the active and inactive applications. The user interface may be the same as or similar to shortcut interface 506 of FIGS. 5, 6A, and 6B. In some embodiments, block 710 can include displaying the list of shortcuts on a touch bar or other type of touchscreen device provided by the computing device. In other embodiments, block 710 can include displaying the list on a touchscreen device or another computing device such as tablet that is paired with computing device.

FIG. 8 shows an illustrative process for handling the selection of shortcuts for both active and inactive applications, according to some embodiments. At block 802, a selection of a shortcut can be received from a user interface, such as a touch bar, tablet, or other touchscreen device. The user interface may be the same as or similar to shortcut interface 506 of FIGS. 5, 6A, and 6B. In some embodiments, the selection may be received as an object (e.g., an event object, such as an NSTouch object). The selection object may identify a unique one of the shortcuts with the list of shortcuts, even if the list includes duplicate shortcuts (i.e., shortcuts for two different applications that happen to have the same name/description/icon/etc.). In some cases, the object may include one or more attributes (e.g., a bundle identifier) that uniquely identifies an application, and these one or more attributes may be used to disambiguate between otherwise identical shortcuts for two different applications. In some embodiments, the selection may be received by invocation of a function (e.g., a callback function). In some embodiments, the selection may by an application that is in an active status of use (e.g., that has focus).

At block 804, the selection (e.g., an event object or a representation thereof) may be forwarded to a service that tracks a plurality of running applications. For example, the selection may be forwarded to shortcut orchestrator 508 of FIG. 5. At block 806, a determination can be made as to which of the plurality of applications is associated with the selected shortcut. In some embodiments, a mapping between shortcuts and applications or between shortcuts and IPC connections may be used to determine the application associated with the selected shortcut. At block 808, the selection may be sent to the application to access a feature thereof.

In some embodiments, blocks 806 and 808 may be performed by the shortcut orchestrator or other service that tracks a plurality of running applications. In other embodiments, blocks 806 and 808 may be performed by the active application that receives the selection. In such embodiments, block 804 may be omitted.

The following examples pertain to further embodiments, from which numerous permutations and configurations will be apparent.

Example 1 includes a method including: receiving, by a computing device, shortcut commands from a plurality of applications, the shortcut commands provide access to features of different applications of the plurality, and the plurality including both active and inactive applications in execution; generating, by the computing device, a list of shortcut commands in response to a transition of a first application of the plurality from a state of inactive use to a state of active use, the list including a shortcut command from at least one inactive application of the plurality; and causing, by the computing device, display of a user interface that includes the list to enable access to a feature of an inactive application in response to selection of at least one shortcut command of the list.

Example 2 includes the subject matter of Example 1 and further includes providing of the list to an active application of the plurality, the active application causing the display of the user interface that includes the list.

Example 3 includes the subject matter of Example 1 or 2, wherein the causing of the display of the user interface includes displaying the list on a touchscreen device.

Example 4 includes the subject matter of any of Examples 1-3, wherein the causing of the display of the user interface includes sending the list to another computing device.

Example 5 includes the subject matter of any of Examples 1-4 and further including: receiving, by the computing device, a selection from the user interface, the selection being a selection of a shortcut command from the list; determining, by the computing device, an application from the plurality for which the shortcut was received; and sending, by the computing device, the selection to the application to access a feature of the application.

Example 6 includes the subject matter of any of Examples 1-5, wherein the list of includes text and images representing one or more of the shortcut commands.

Example 7 includes the subject matter of any of Examples 1-6, wherein the plurality of applications includes at least one web application.

Example 8 includes the subject matter of any of Examples 1-7, wherein the plurality of applications includes at least one application running on a remote computing device.

Example 9 includes the subject matter of any of Examples 1-8, wherein the generating of the list of shortcut commands includes generating an ordered list of shortcut commands based on a ranking.

Example 10 includes the subject matter of Example 9, wherein the generating of the ordered list is based on relative positions of windows of the plurality of applications displayed on the computing device.

Example 11 includes an apparatus including a processor and a non-volatile memory storing computer program code that when executed on the processor causes the processor to execute a process, where the process includes: receiving, by a computing device, shortcut commands from a plurality of applications, the shortcut commands provide access to features of different applications of the plurality, and the plurality including both active and inactive applications in execution; generating, by the computing device, a list of shortcut commands in response to a transition of a first application of the plurality from a state of inactive use to a state of active use, the list including a shortcut command from at least one inactive application of the plurality; and causing, by the computing device, display of a user interface that includes the list to enable access to a feature of an inactive application in response to selection of at least one shortcut command of the list.

Example 12 includes the subject matter of Example 11, wherein the process further includes providing of the list to an active application of the plurality, the active application causing the display of the user interface that includes the list.

Example 13 includes the subject matter of Example 11 or 12, wherein the causing of the display of the user interface includes displaying the list on a touchscreen device.

Example 14 includes the subject matter of any of Examples 11-13, wherein the causing of the display of the user interface includes sending the list to another computing device.

Example 15 includes the subject matter of any of Examples 11-14, wherein the process further includes: receiving, by the computing device, a selection from the user interface, the selection being a selection of a shortcut command from the list; determining, by the computing device, an application from the plurality for which the shortcut was received; and sending, by the computing device, the selection to the application to access a feature of the application.

Example 16 includes the subject matter of any of Examples 11-15, wherein the list of includes text and images representing one or more of the shortcut commands.

Example 17 includes the subject matter of any of Examples 11-16, wherein the plurality of applications includes at least one web application.

Example 18 includes the subject matter of any of Examples 11-17, wherein the plurality of applications includes at least one application running on a remote computing device.

Example 19 includes the subject matter of any of Examples 11-18, wherein the generating of the list of shortcut commands includes generating an ordered list of shortcut commands based on a ranking.

Example 20 includes a non-transitory machine-readable medium encoding instructions that when executed by one or more processors cause a process to be carried out, where the process includes: receiving, by a computing device, shortcut commands from a plurality of applications, the shortcut commands provide access to features of different applications of the plurality, and the plurality including both active and inactive applications in execution; generating, by the computing device, a list of shortcut commands in response to a transition of a first application of the plurality from a state of inactive use to a state of active use, the list including a shortcut command from at least one inactive application of the plurality; and causing, by the computing device, display of a user interface that includes the list to enable access to a feature of an inactive application in response to selection of at least one shortcut command of the list.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:
   receiving, by a shortcut orchestrator executing on a computing device, one or more lists of shortcut commands from respective applications of a plurality of applications, wherein the shortcut commands provide access to features of different applications of the plurality, and the plurality includes both active and inactive applications in execution;
   generating, by the shortcut orchestrator, a combined list of shortcut commands from the one or more lists of shortcut commands, in response to a transition of a first application of the plurality from a state of inactive use to a state of active use, the combined list including a shortcut command from at least one inactive application of the plurality of applications; and
   providing, by the shortcut orchestrator, the list of shortcuts to an active application of the plurality, the active application invoking a system call of the computing device to cause display of a user interface that includes the list to enable access to a feature of an inactive application in response to selection of at least one shortcut command of the list.

2. The method of claim 1, further comprising providing of the list to an active application of the plurality, the active application causing the display of the user interface that includes the list.

3. The method of claim 1, wherein the causing of the display of the user interface includes displaying the list on a touchscreen device.

4. The method of claim 1, wherein the causing of the display of the user interface includes sending the list to another computing device.

5. The method of claim 1, further comprising:
   receiving, by the computing device, a selection from the user interface, the selection being a selection of a shortcut command from the list;
   determining, by the computing device, an application from the plurality for which the shortcut was received; and
   sending, by the computing device, the selection to the application to access a feature of the application.

6. The method of claim 1, wherein the list of includes text and images representing one or more of the shortcut commands.

7. The method of claim 1, wherein the plurality of applications includes at least one application running on a remote computing device.

8. The method of claim 1, wherein the generating of the list of shortcut commands includes generating an ordered list of shortcut commands based on a ranking.

9. The method of claim 8, wherein the generating of the ordered list is based on relative positions of windows of the plurality of applications displayed on the computing device.

10. An apparatus comprising:
    a processor; and
    a non-volatile memory storing computer program code that when executed on the processor causes the processor to execute a process including:
    receiving, by a shortcut orchestrator executing on a computing device, one or more lists of shortcut commands from respective applications of a plurality of applications, wherein the shortcut commands provide access to features of different applications of the plurality, and the plurality includes both active and inactive applications in execution;

generating, by the shortcut orchestrator, a combined list of shortcut commands from the one or more lists of shortcut commands, in response to a transition of a first application of the plurality from a state of inactive use to a state of active use, the combined list including a shortcut command from at least one inactive application of the plurality of applications; and providing, by the shortcut orchestrator, the list of shortcuts to an active application of the plurality, the active application invoking a system call of the computing device to cause display of a user interface that includes the list to enable access to a feature of an inactive application in response to selection of at least one shortcut command of the list.

11. The apparatus of claim 10, wherein the process further includes providing of the list to an active application of the plurality, the active application causing the display of the user interface that includes the list.

12. The apparatus of claim 10, wherein the causing of the display of the user interface includes displaying the list on a touchscreen device.

13. The apparatus of claim 10, wherein the causing of the display of the user interface includes sending the list to another computing device.

14. The apparatus of claim 10, wherein the process further includes:
receiving, by the computing device, a selection from the user interface, the selection being a selection of a shortcut command from the list;
determining, by the computing device, an application from the plurality for which the shortcut was received; and
sending, by the computing device, the selection to the application to access a feature of the application.

15. The apparatus of claim 10, wherein the list of includes text and images representing one or more of the shortcut commands.

16. The apparatus of claim 10, wherein the plurality of applications includes at least one web application.

17. The apparatus of claim 10, wherein the plurality of applications includes at least one application running on a remote computing device.

18. The apparatus of claim 10, wherein the generating of the list of shortcut commands includes generating an ordered list of shortcut commands based on a ranking.

19. A non-transitory machine-readable medium encoding instructions that when executed by one or more processors cause a process to be carried out, the process comprising:
receiving, by a shortcut orchestrator executing on a computing device, one or more lists of shortcut commands from respective applications of a plurality of applications, wherein the shortcut commands provide access to features of different applications of the plurality, and the plurality includes both active and inactive applications in execution;

generating, by the shortcut orchestrator, a combined list of shortcut commands from the one or more lists of shortcut commands, in response to a transition of a first application of the plurality from a state of inactive use to a state of active use, the combined list including a shortcut command from at least one inactive application of the plurality of applications; and providing, by the shortcut orchestrator, the list of shortcuts to an active application of the plurality, the active application invoking a system call of the computing device to cause display of a user interface that includes the list to enable access to a feature of an inactive application in response to selection of at least one shortcut command of the list.

* * * * *